Jan. 12, 1932. C. E. GIRTON 1,840,811
ANKLE JOINT FOR ARTIFICIAL LIMBS
Filed April 9, 1929 2 Sheets-Sheet 1
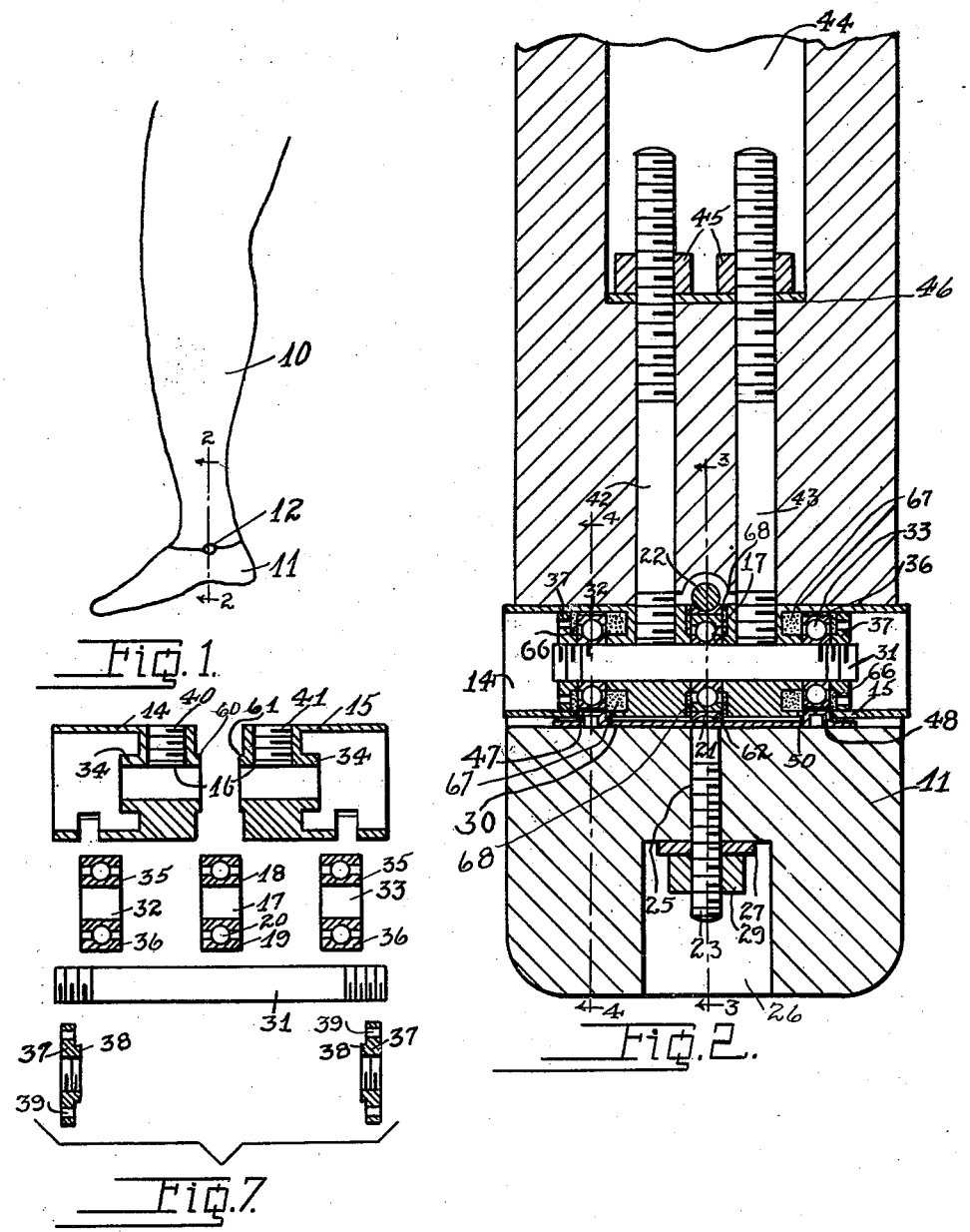
Charles E. Girton
INVENTOR.
BY
Joseph A. Rave
ATTORNEY.

Jan. 12, 1932.   C. E. GIRTON   1,840,811
ANKLE JOINT FOR ARTIFICIAL LIMBS
Filed April 9, 1929   2 Sheets-Sheet 2

CHARLES E. GIRTON
INVENTOR.

BY
Joseph A. Rave
ATTORNEY.

Patented Jan. 12, 1932

1,840,811

UNITED STATES PATENT OFFICE

CHARLES E. GIRTON, OF CINCINNATI, OHIO

ANKLE-JOINT FOR ARTIFICIAL LIMBS

Application filed April 9, 1929. Serial No. 353,712.

This invention relates to improvements in an ankle-joint for artificial limbs.

An object of this invention is to provide a ball bearing ankle-joint.

Another object of this invention is to provide an ankle-joint wherein the entire weight of the wearer is placed upon anti-friction bearings or balls.

Another object of this invention is to provide a device of this class wherein one race of the ball bearings moves with the foot member while the other race moves with the leg member.

These and other objects are attained by the means described in the accompanying drawings in which:

Fig. 1 is a side elevation of an artificial limb having embodied therein a device of this invention.

Fig. 2 is a fragmentary vertical section through the ankle-joint as on line 2—2 of Fig. 1.

Fig. 7 is a sectional view of some of the component parts of the improved ankle-joint forming details of this invention.

Throughout the drawings similar reference characters are used to indicate similar or corresponding parts.

Figure 5:
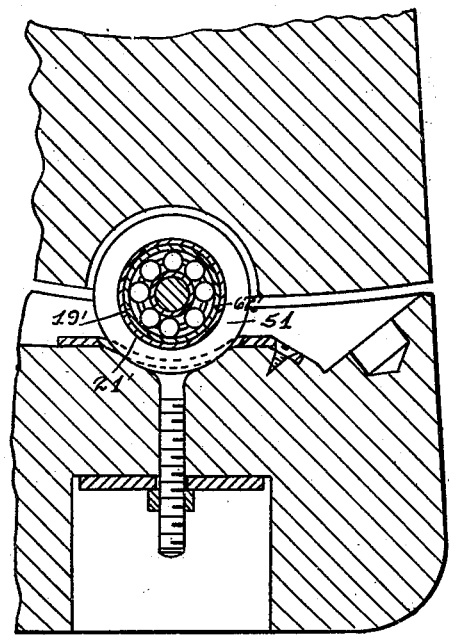
Fig. 5 is a fragmentary sectional view similar to Fig. 3 showing a slight modification.
Figure 3:
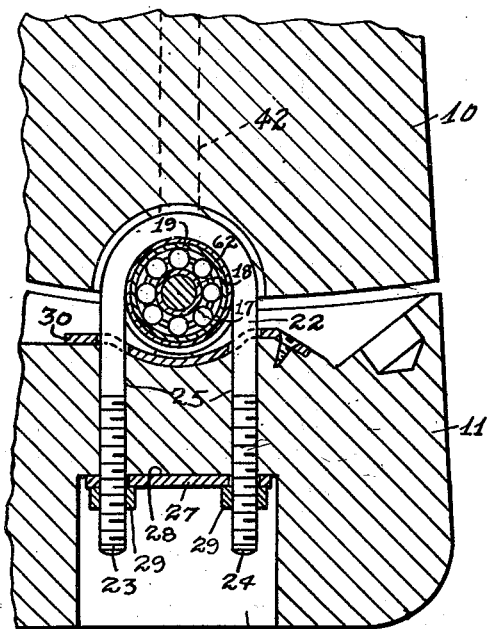
Fig. 3 is a fragmentary vertical section through the ankle-joint taken at right angles to Fig. 2 as on line 3—3 of Fig. 2.
Figure 4:
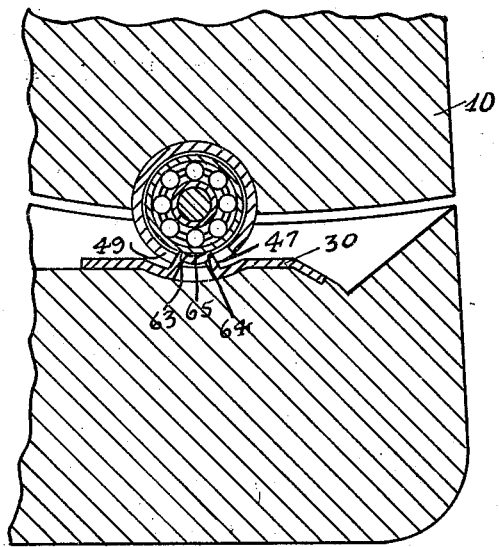
Fig. 4 is a fragmentary section through another portion of the ankle-joint as on line 4—4 of Fig. 2.
Figure 6:
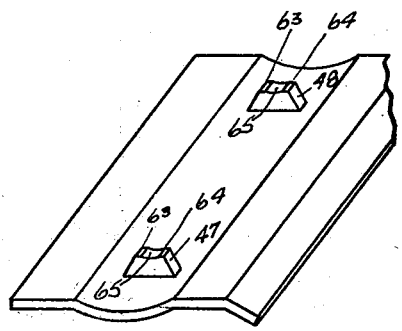
Fig. 6 is a perspective view of the clamp forming a detail of the invention.

The reference character 10 indicates the leg or tebia of an artificial limb having pivotally secured thereto as by ankle-joint 12 a foot member 11. The ankle-joint 12 comprises a pair of substantially cup shaped sleeves 14 and 15 having a bore 16 extending axially therethrough. These sleeves 14 and 15 are spaced from one another by anti-friction or ball bearings 17 located about midway between the latter sides of the foot member 11. The anti-friction bearing 17 comprises an inner race 18 and an outer race 19 between which the anti-friction bearings or balls 20 are positioned. As illustrated, the adjacent faces of the sleeves 14 and 15 are provided with bosses 60 and 61 extending toward one another and in abutment with the opposite sides of the inner race 18. It should be noted, however, that the races may be of dissimilar width, that is, the outer race 19 would be slightly narrower than the inner race 18. This would result in the inner race being in abutment with the base of the sleeves and the outer race being spaced somewhat therefrom.

The outer race 19 is pressed into a ring member 62 and secured thereto against relative movement such as by sweating, welding or any other method. A groove 21 is formed in the outer surface of the ring 62 for receiving a U bolt 22, which bolt is provided with arms 23 and 24. The ring 62 and U bolt 21 are sweated together to prevent relative movement thereof. The arms 23 and 24 are provided with suitable threads and extend through perforations 25 formed in the foot member 11. The ends of the arms 23 and 24 terminate in a recess 26 formed in the base of the foot 11. A suitable foot plate 27 passes over the ends of the arms 23 and 24 and lies against the upper end 28 of the recess 26. Nuts 29 are threadedly received by the arms 23 and 24 and abut the foot plate 27 for securing the U shaped bolt 22 to the foot plate. Intermediate the foot 11 and the cup shaped sleeves 14 and 15 is a clamp plate or top plate 30 whose function and description will be presented later.

Extending through the aligned bores 16 in the sleeves 14 and 15 is a shaft 31 upon which the bearing 17 as well as the anti-friction bearings 32 and 33 are mounted. The sleeves 14 and 15 are each provided with a boss 34 extending from the base of the cup shaped sleeves into the sleeves which engage one side of the inner races 35 of the anti-friction bearings 32 and 33. The outer races 36 of these bearings are slightly smaller in diameter than the bore of the sleeves and are therefore spaced from the inner wall of said sleeves. End caps 37 are threadedly received on opposite ends of the shaft 31 and are provided with bosses 38 extending toward the bosses 34 and in engagement with the inner race 35 for clamping said inner race between said bosses 34 on the base of the sleeves 14 and 15 and the bosses on the end caps 37. The caps 37 also force the cup shaped sleeves 14 and 15 toward one another thereby clamping the inner race 18 of the anti-friction bearing 17 to the sleeves so that said inner race moves with the sleeves 14 and 15. These caps 37 are provided with suitable openings 39 for receiving the prongs of a wrench or other suitable tool.

The sleeves 14 and 15 are provided near their opposed ends with threaded perforations 40 and 41 for receiving the threaded end of studs 42 and 43. These studs 42 and 43 extend through suitable bores provided in the lower end of the leg 10 and terminate in the hollow part 44 of the leg 10. The upper ends of the studs are also threaded for the reception of suitable nuts 45 which abut the plate 46 within the hollow part 44 of the leg 10. The ends of the studs 42 and 43 received in the threaded perforations 40 and 41 engage the shaft 31 for holding same in place and prevent relative movement of the sleeves 14 and 15 about the axis of the said shaft 31.

As noted above, a clamp plate or top plate 30 is provided intermediate the foot 11 and sleeves 14 and 15. This plate has extending from it lugs 47 and 48 which extend through openings 49 and 50 formed respectively in the sleeves 14 and 15 in alignment with anti-friction bearings 32 and 33. Lugs 48 and 49 are provided with substantial points 63 and 64 having a cradle 65 between them. The outer races 36 are received in the cradle 65 and engaged by the points or projections 63 and 64 clamping them in place. It has been found that this construction effectively clamps and holds the outer races for movement only with the foot member. Also the points 63 and 64 prevent any lateral movement of the foot member relative to the leg member.

From the foregoing description it will be noted that the inner races 35 and 18 of the anti-friction bearings 32, 33 and 17 are secured together to move with the sleeves 14 and 15 while the outer races 36 and 19 of the anti-friction bearings 32, 33 and 17 are clamped by the lugs 47 and 48 and U bolt 22 to the foot member and move therewith. In this way a true anti-friction or ball bearing ankle-joint is provided wherein all the weight and movement is on the anti-friction bearings or balls. It will be noted that the openings 49 and 50 are sufficiently elongated to permit the necessary movement of the foot member 11 relative to the leg or tebia member 10.

In the event of wear on the outer races 36 of the bearings 32 and 36, which is very problematical, it is only necessary to loosen the members enough to be enabled to rotate said outer races 36 a fraction of a revolution to bring a new portion of same within the cradle 65 and points 63 and 64 and reclamp the members together.

In the modification shown in Fig. 5, an eye bolt 51 is utilized in lieu of the U bolt 22. In this construction the outer race 19' is also sweated into or otherwise secured in a ring member 62' provided with a groove 21'. The eye bolt 51 has pressed into it the ring member 62' forming an integral structure.

Suitable means may be provided to prevent foreign matters from working into the ball bearings of the ankle-joint and thereby causing undue wear on the balls or races. This means may take the form of semi-soft washers, such as felt, which are provided adjacent each side of the bearings. As shown in Fig. 2 washers 66 surround bosses 38 on each end cap 37 and lie between said end caps 37 and bearings 32 and 33 to prevent any dirt, grit or the like that may enter the cup shaped sleeves from finding its way into the bearings 32 and 33. Washers 67 surround bosses 34 and lie between the bases of the cup shaped sleeves and the other sides of bearings 32 and 33 to prevent foreign matters from getting into the bearings through the elongated openings 47 and 48. Likewise washers 68 are utilized for the bearing 17 and surround the bosses 60 and 61 and lie adjacent each side of said bearing 17 to exclude all foreign matter therefrom that might find its way between the upper and lower members of the limb. The washers 66, 67 and 68 also form a means to prevent escape of grease, lubricant or the like from the bearings, in which grease they had been packed when the ankle-joint was assembled. It should be noted that these washers in no wise interfere with the operation of the mechanism.

It is believed that the foregoing description fully discloses the improved ankle-joint, and it is to be understood that numerous modifications may be made within the scope of this invention and the claims appended hereto.

What is claimed is:

1. In an ankle-joint for artificial limbs comprising anti-friction bearings, the bearing having inner and outer races, means for securing the inner races to one of the members of an artificial limb, a clamp plate contacting the other member of the artificial limb and secured thereto, and means on said plate for securing the outer race of the bearings.

2. In an ankle-joint for artificial limbs the combination of a shaft, opposed cup shaped sleeves slidably received by the shaft, anti-friction bearings within the sleeves, an anti-friction bearing intermediate the sleeves, each of the bearings comprising an inner and an outer race, means surrounding the second bearing and extending through one member of the artificial limb for securing the outer race to the member, means within the sleeves for securing the inner race to the shaft, and means for clamping the shaft in position and with the other member of the artificial limb.

3. In a device of the class described the combination of a pair of sleeve members, an anti-friction bearing intermediate the sleeves having an inner and an outer race, means extending about the outer race and secured to said outer race, said means passing through the foot member of an artificial limb and securing the outer race to said foot member, and means for clamping the inner race between the sleeves.

4. In an ankle-joint the combination of a pair of cup shaped sleeves each comprising a base and a boss on each base, an anti-friction bearing within each sleeve comprising an inner and an outer race, the inner race of each bearing contacting with a boss in each sleeve, each sleeve having an elongated perforation in alignment with the anti-friction bearing, means for clamping each inner race against its respective boss, a shaft extending through the sleeve and inner races, studs for securing the sleeves relative to the shaft and said sleeves to the leg member of an artificial limb, and a plate carried by the foot member said plate having lugs protruding into the elongated perforation in the sleeves for clamping the outer races of the anti-friction bearings to the foot member.

5. In an ankle-joint the combination with anti-friction bearings, sleeves for receiving the anti-friction bearings, each bearing comprising an inner and an outer race, means for clamping the inner races to the sleeves and securing the sleeves to the leg member, of a plate secured to the foot member and having lugs thereon for clamping the outer races to the said foot member for movement therewith.

6. A plate clamping member for anti-friction ankle-joints conforming substantially to the form of one member of an artificial limb and comprising a lug extending therefrom, said lug having a pair of points and a cradle between the points, the cradle conforming substantially to the periphery of the anti-friction bearings and the points engaging and clamping said bearing to prevent axial movement thereof.

7. In an ankle-joint the combination of a pair of opposed cup shaped sleeves each comprising a base and a boss on each side of the base, an anti-friction bearing intermediate the opposed bosses on the sleeves, an anti-friction bearing within each sleeve, each bearing comprising an inner race, said inner races contacting the bosses on each sleeve and means for forcing the sleeves toward one another clamping same into an integral unit and clamping the inner races between the bosses so that they move with the sleeves.

8. In a device of the class described the combination of a pair of opposed cup shaped sleeves each comprising a base and an elongated perforation, an anti-friction bearing between the opposed bases of the sleeves, an anti-friction bearing within each sleeve and spaced therefrom, each bearing having an outer race, the outer races of the bearings within the sleeves being in alignment with the elongated perforations therein, and means for clamping the outer races to one member of an artificial limb and to move therewith as a unit.

9. In a device of the class described the combination of a pair of opposed cup shaped sleeves each comprising a base and an elongated perforation, an anti-friction bearing between the opposed bases of the sleeves, an anti-friction bearing within each sleeve and spaced therefrom, each bearing having an outer race, the outer races of the bearings within the sleeves being in alignment with the elongated perforations therein, means for clamping the outer races to one member of an artificial limb and to move therewith as a unit, and means adjacent each side of the bearings to exclude foreign matters therefrom.

In testimony whereof, I have hereunto subscribed my name this 27th day of March, 1929.

CHARLES E. GIRTON.